Aug. 13, 1957 W. B. KARKOW, JR 2,802,416
CHECK ENDORSING APPARATUS
Filed Oct. 12, 1955 6 Sheets-Sheet 4

Inventor:
Waldemar B. Karkow, Jr.
By Robert F. Miehle, Jr. Atty.

Aug. 13, 1957
W. B. KARKOW, JR
2,802,416
CHECK ENDORSING APPARATUS
Filed Oct. 12, 1955
6 Sheets-Sheet 5
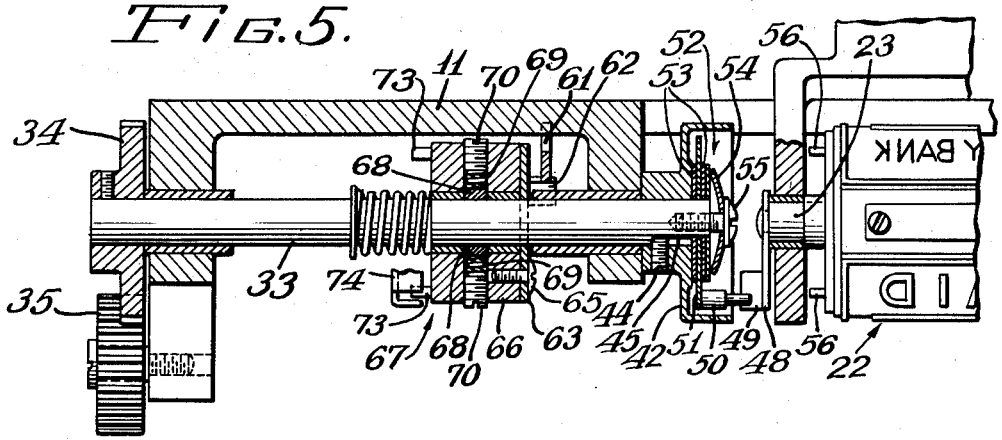
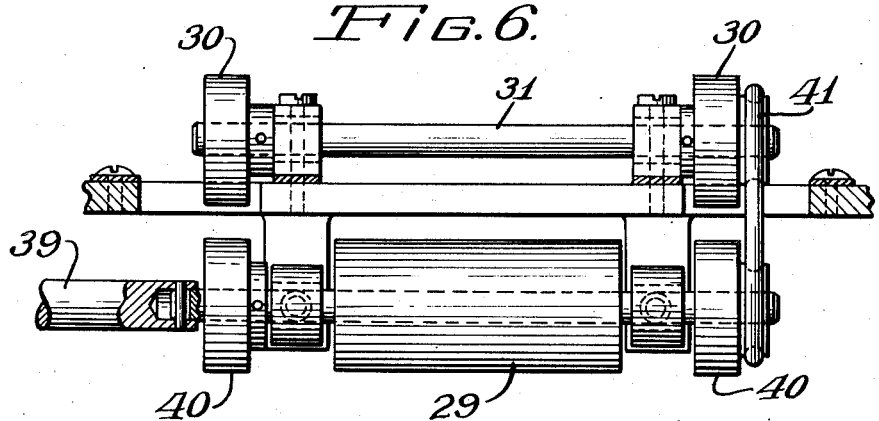
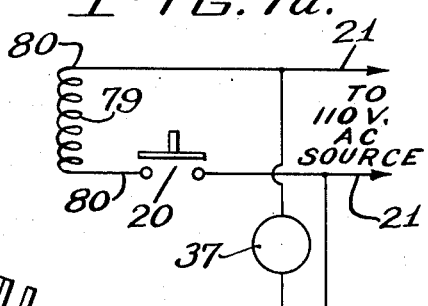
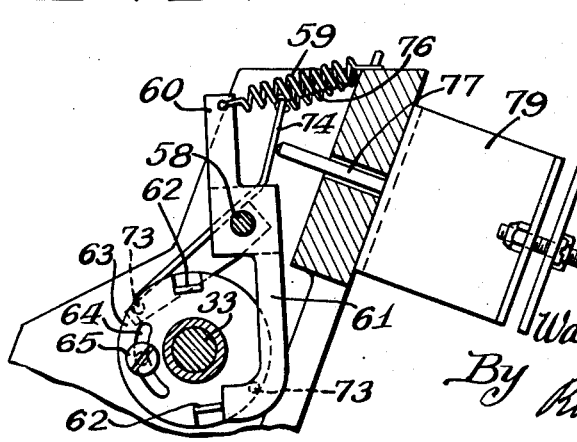
Inventor:
Waldemar B. Karkow, Jr.
By Robert F. Miehle, Atty.

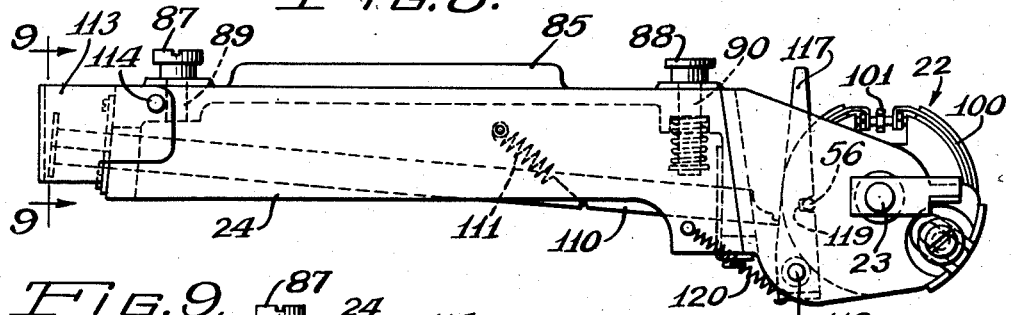
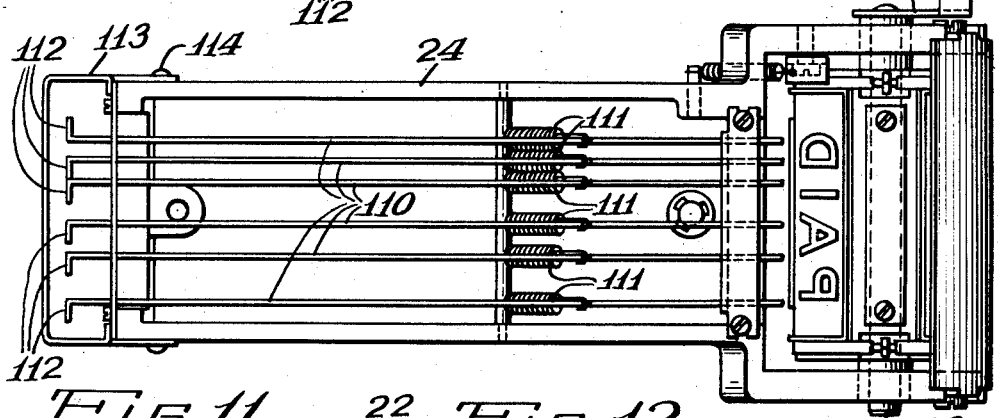

United States Patent Office 2,802,416
Patented Aug. 13, 1957

2,802,416

CHECK ENDORSING APPARATUS

Waldemar B. Karkow, Jr., Wilmette, Ill., assignor to Bell & Howell Company, Chicago, Ill., a corporation of Illinois Application October 12, 1955, Serial No. 540,114

6 Claims. (Cl. 101—235)

This invention relates, generally, to check endorsing apparatus for endorsing automatically bank checks and the like.

Among the objects of this invention are: To synchronize the endorsing operations with the feeding of the checks to the endorsing means; to operate the type roller from a continuously driven shaft by intermittently placing the type roller in driving connection therewith each time that a check is to be endorsed; to effect the driving connection through a friction clutch and to restrain rotation of the type roller until a check is to be endorsed; to release the restraint on the type roller in response to the presence of a check to be endorsed; to employ electro-magnetic means responsive to the operation of a pulse switch operated by the passage of a check along a predetermined path for releasing the restraining means; and to interpose an auxiliary friction clutch between the means for releasing the restraint on the type roller and the electro-magnetic means and to drive the auxiliary friction clutch by the shaft that drives the type roller.

Other objects of this invention will, in part, be obvious and in part appear hereinafter.

This invention is disclosed in the embodiment thereof shown in the accompanying drawings and it comprises the features of construction, combination of elements and arrangement of parts that will be exemplified in the construction hereinafter set forth and the scope of the application of which will be indicated in the appended claims.

For a more complete understanding of the nature and scope of this invention reference can be had to the following detailed description, taken together with the accompanying drawings, in which:

Figure 5 is a sectional view, at an enlarged scale, taken generally along the line 5—5 of Figure 2;

Figure 6 is a sectional view, at an enlarged scale, taken generally along the line 6—6 of Figure 2;

Figure 7 is a vertical sectional view, at an enlarged scale, taken generally along the line 7—7 of Figure 2;

Figure 7a illustrates diagrammatically the electrical connections that are employed in the portion of the check endorsing machine disclosed herein;

Figure 8 is a view, in side elevation, of the auxiliary frame carrying the type roller, the assembly being shown in detached relation;

Figure 9 is a vertical sectional view taken generally along the line 9—9 of Figure 8;

Figure 10 is a bottom plan view of the mechanism shown in Figure 8;

Figure 11 is a horizontal sectional view through the type roller;

Figure 12 is a vertical sectional view taken generally along the line 12—12 of Figure 11; and Figure 13 is a view, in end elevation, of the type roller.

Figure 1:
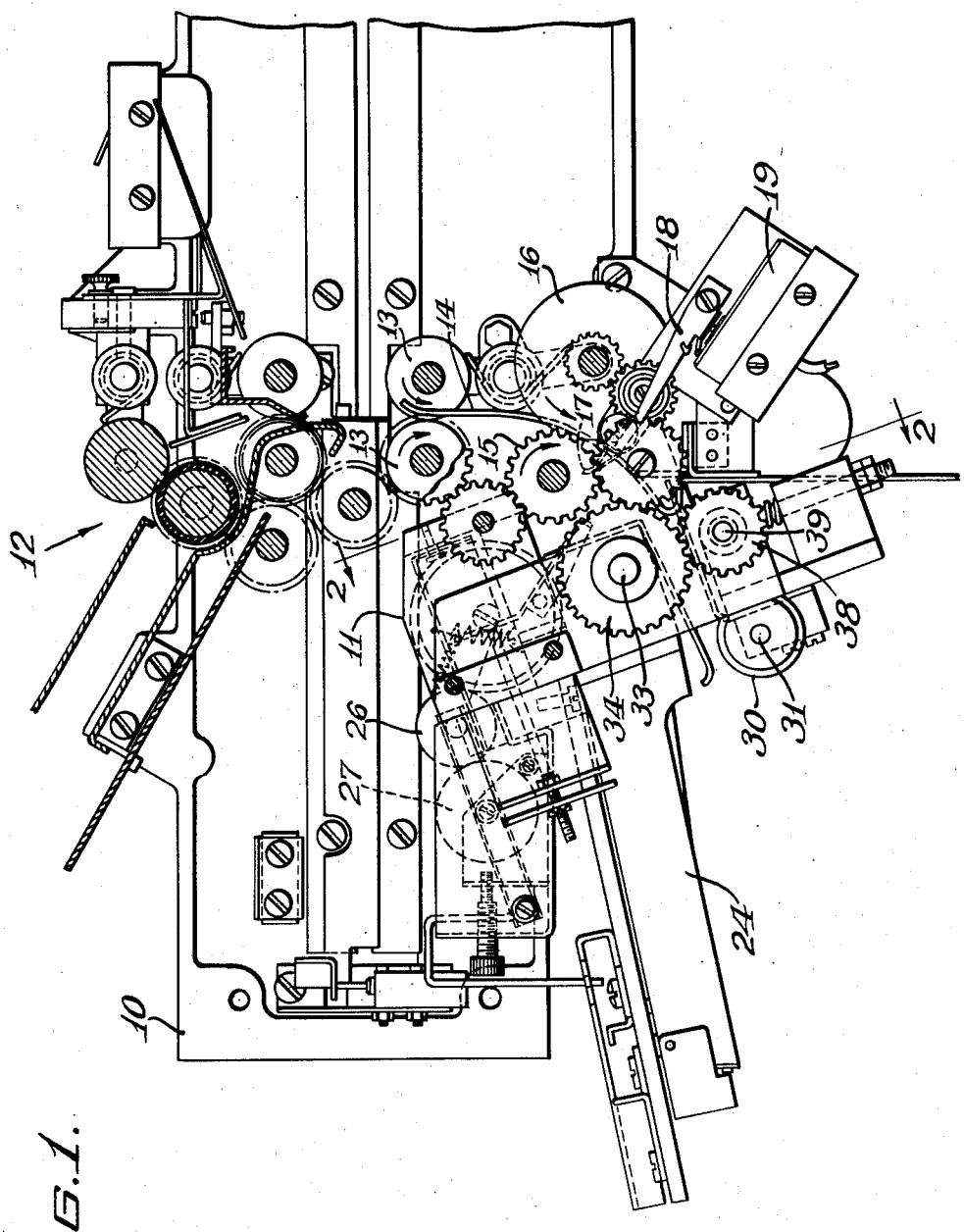
Figure 1 is a vertical sectional view of a portion of a check endorsing machine in which the present invention is embodied.
Figure 2:
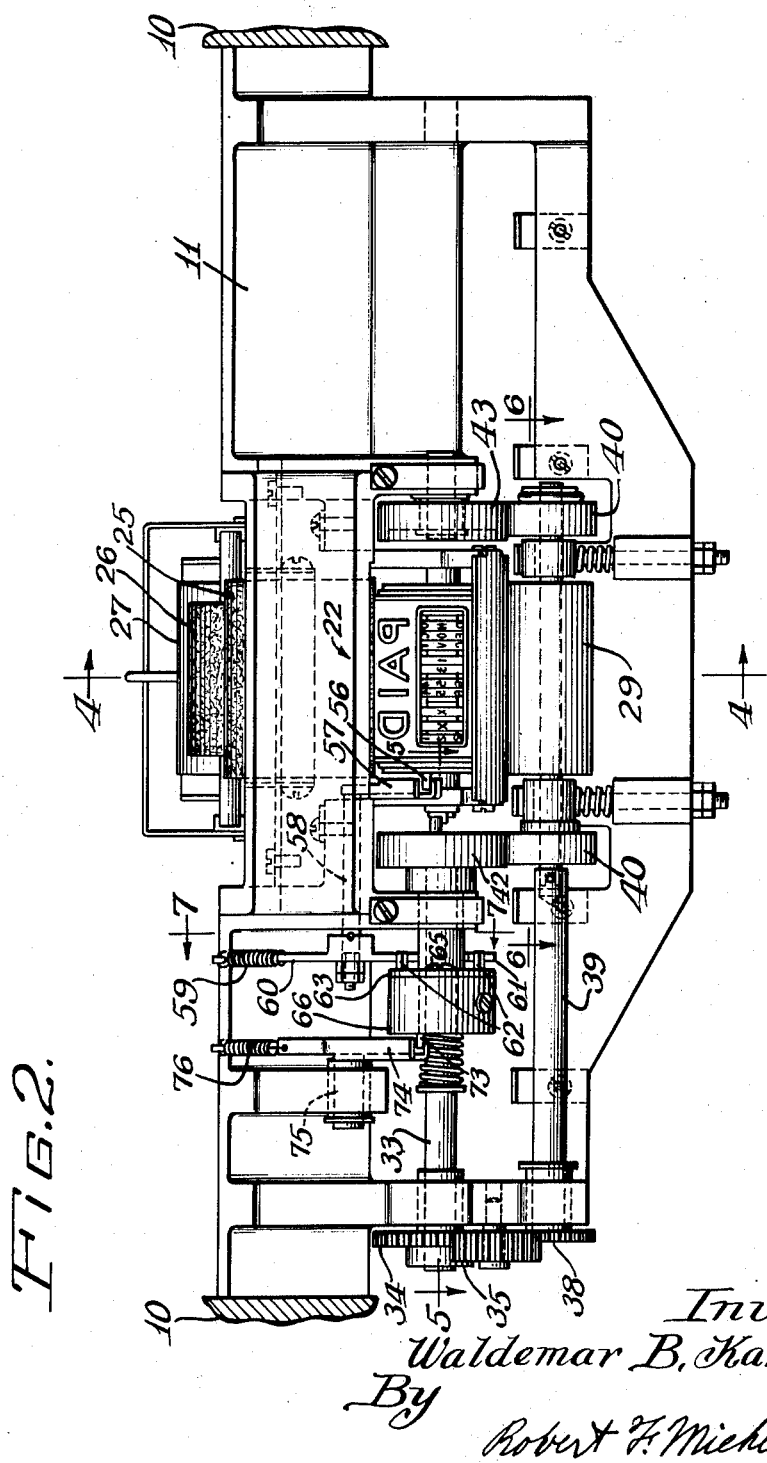
Figure 2 is a view, in front elevation, of the lower portion of the check endorsing machine shown in Figure 1, taken along line 2—2 of Figure 1.
Figure 4:
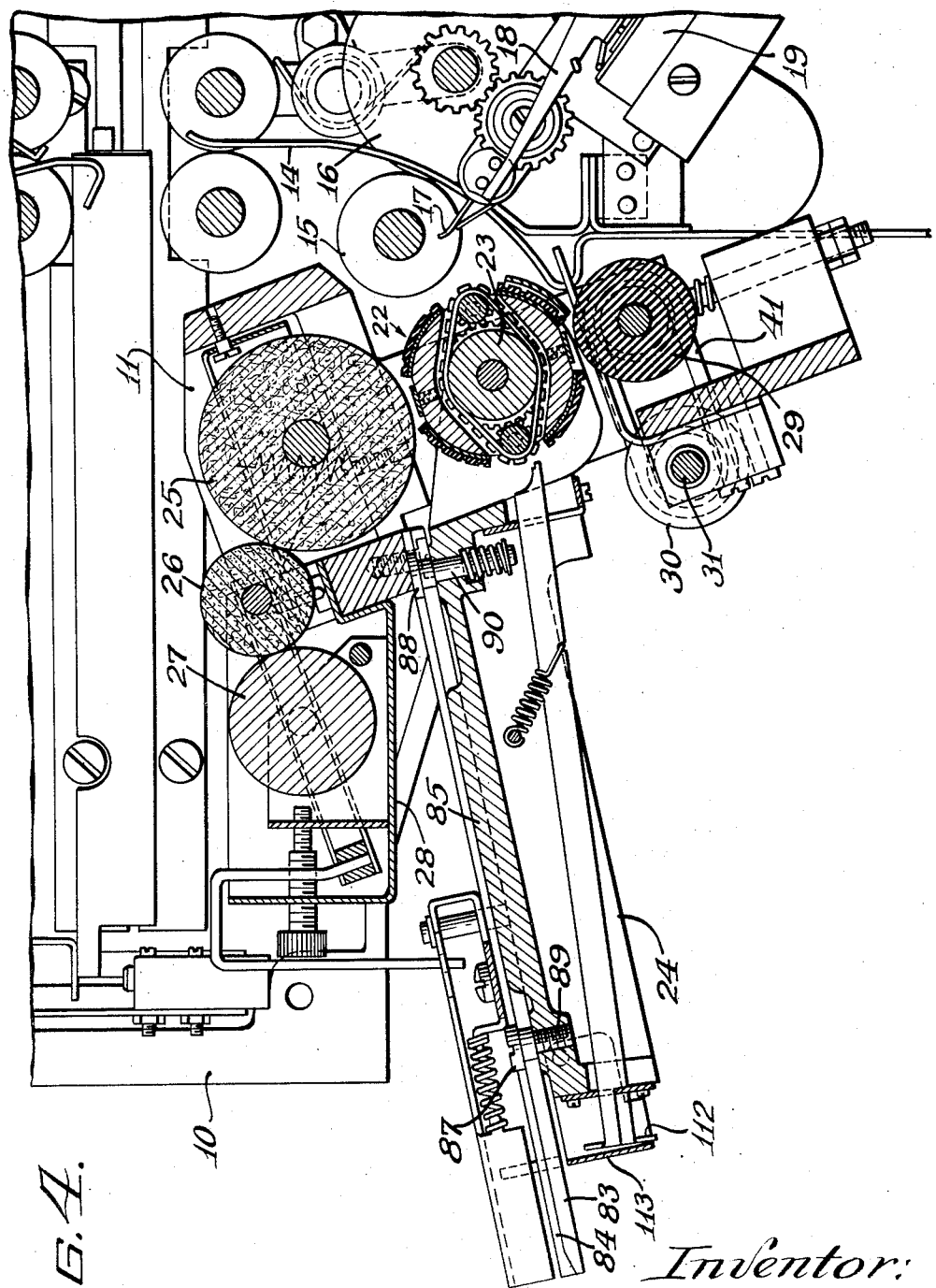
Figure 4 is a sectional view, at an enlarged scale, taken generally along the line 4—4 of Figure 2.

Referring now particularly to Figures 1 and 4 of the drawings, it will be observed that the reference character 10 designates a portion of a main frame of the check endorsing machine. As shown in Figure 2 a transverse frame 11 extends between portions of the main frame 10 and constitutes the principal support for the mechanism to be described presently. As shown near the upper portion of Figure 1 there is a roller guiding mechanism, illustrated generally at 12, for directing a bank check to be endorsed downwardly where it is picked up by a pair of guide rollers 13 and directed over a guide strip 14 between a guide roller 15 and a large diameter guide roller 16.

The presence of the check to be endorsed is detected by its engagement with a wing 17 of a flipper which is arranged to move a switch operator lever 18 for operating pulse switch 19. The details of construction of the flipper and the mechanism for operating the pulse switch 19 are set forth in my copending application Serial No. 537,254, filed September 28, 1955, and will not be described further herein other than to point out that the contacts of the pulse switch 19 are indicated at 20 in Figure 7a of the drawings where they are employed to complete a circuit from conductors 21 which, as indicated, are connected to be energized from a 110 volt alternating current source.

As shown in Figure 4 the bank check, after it has moved the wing 17 of the flipper out of its path is fed underneath a type roller, as shown generally at 22, and rotatably mounted with a shaft 23 on the forward end of an auxiliary frame 24 which is slidably and detachably mounted on the transverse frame 11 in a manner to be described hereinafter. Above the type roller 22 is an inking roller 25 which is rotatably mounted on the transverse frame 11. Cooperating with the inking roller 25 is a transfer roller 26 which picks up ink from a fountain roller 27 that rotates in an ink reservoir 28. Below the type roller 22 is an impression roller 29 over which the check to be endorsed passes for holding it in endorsing relation to the type roller 22. Guide rollers 30, mounted on a shaft 31 and rotatable therewith, function to convey the endorsed check away from the type roller 22 and impression roller 29.

As shown in Figures 2 and 5 the type roller 22 is arranged to be driven from a drive shaft 33 that is journaled in the transverse frame 11. Fast on one end of the shaft 33 is a gear wheel 34 which meshes with a pinion 35 that in turn engages a drive pinion 36, Figure 3, which is driven continuously by a motor 37. The motor 37 is shown diagrammatically in Figure 7a. It will be understood that the driving connection to the pinion 35 may be provided by means other than the drive pinion 36 and motor 37. For illustrative purposes the particular drive for the pinion 35 is shown as described, but it will be understood that the drive may be otherwise applied to the mechanism as desired.

Also driven from the pinion 35 is a gear wheel 38, Figure 2, which is fast on one end of a shaft 39 which has the impression roller 29 fast on the other end. Guide rollers 40, Figure 6, are driven conjointly with the shaft 39 and impression roller 29 and a belt 41 connects them to the shaft 31 for driving the guide rollers 30.

It will be noted from Figures 2 and 5 that the axis of rotation of the drive shaft 33 is coincident with the axis of rotation of the shaft 23 on which the type roller 22 is mounted. At the ends of the type roller 22 and rotatable independently thereof are guide rollers 42 and 43 which overlie the guide rollers 40 and serve to direct properly a check into endorsing relation between the type roller 22 and the impression roller 29. The guide roller 43 is driven by the guide roller 40 in contact therewith or through the check when positioned therebetween.

As shown in Figure 5 the guide roller 42 is secured by a set screw 44 to a flat slabbed off portion 45 of the end of the drive shaft 33. Thus the guide roller 42 is rotatable conjointly with the drive shaft 33. Extending radially from the drive shaft 23 at the end adjacent the guide roller 42 is a driving arm 48 which is provided with an outwardly extending flange 49 for engagement by a pin 50 that is carried by a slip disc 51 which forms a part of a friction clutch, shown generally at 52, and mounted on the end of the drive shaft 33 and within the guide roller 42. The slip disc 51 is located between friction discs 53 which have interfitting relation with the slabbed off portion 45 of the drive shaft 33 and thus are driven conjointly therewith while the slip disc 51 is free to rotate relative to the drive shaft 33 except for the friction drive between it and the friction discs 53. It will be noted that a single friction disc 53 is positioned on the left hand side of the slip disc 51 and that two such friction discs are located on the other side. A spring washer 54 held by a screw 55 serves to apply the required friction force between the friction discs 53 and the slip disc 51. It will be understood that, when the type roller 22 is free to rotate, the continuously rotating drive shaft 33 is in driving connection therewith through the friction clutch 52, the pin 50 and the driving arm 48.

Provision is made for restraining the type roller 22 against rotation except when a check is to be endorsed thereby. For this purpose detents 56 are provided on the end of the type roller adjacent the driving arm 48 in diametrically opposite positions and equidistant from the axis of rotation of the type roller 22. As shown in Figure 2 a type roller locking arm 57 cooperates with one or the other of the detents 56 to restrain the type roller 22 from rotating. When this occurs, the slip disc 51 is held against rotation while the drive shaft 33 and the friction discs 53 continue to rotate. The type roller locking arm 57 is mounted on a shaft 58 which is rockably mounted on the transverse frame 11. A spring 59 is provided for biasing the type roller locking arm 57 into operative engagement with one or the other of the detents 56. It will be observed that the spring 59 is secured at one end to the transverse frame 11 and at its other end it is connected to an arm 60 which is fast on the end of the shaft 58 opposite that where the type roller locking arm is located.

In Figure 7 of the drawings the relationship of the spring 59 to the arm 60 on the shaft 58 is shown more clearly. In order to release the type roller locking arm from engagement with the detent 56 an operating arm 61 is provided which constitutes an extension of the arm 60 and it is arranged to be engaged by one or the other of two type roller releasing cams 62 which project outwardly from a plate 63 that has an arcuate slot 64 through which a holding screw 65 projects into a clutch sleeve 66 that is mounted on the drive shaft 33 as shown more clearly in Figure 5. It will be understood that the arcuate slot 64 is provided in order to permit adjustment of the plate 63 relative to the clutch sleeve 66. As shown in Figure 7 the plate 63 is mounted for rotation about the axis of the drive shaft 33 and that the type roller releasing cams 62 are located in diametrically opposite positions with respect to this axis. The plate 63 rotates with the drive shaft 33 only when the clutch sleeve 66 rotates therewith.

As shown in Figure 5 the clutch sleeve 66 constitutes a part of an auxiliary clutch, shown generally at 67, which has a sliding friction connection to the drive shaft 33. For this purpose friction shoes 68 are employed and they are biased into frictional engagement with the shaft 33 by coil compression springs 69 the tension of which can be adjusted by screws 70 that are threaded radially into the clutch sleeve 66.

In accordance with this invention provision is made for holding the clutch sleeve 66 against rotation until a check engages the wing 17 and effects the operation of the pulse switch 19. The retention of the clutch sleeve 66 against rotation is effected through the provision of detents 73 which project outwardly therefrom and are located in diametrically opposite positions with respect to the axis of rotation of the drive shaft 33. Cooperating with one or the other of the detents 73 is a clutch locking arm 74 which is pivoted at 75, Figure 2, on the transverse frame 11. A spring 76 biases the clutch locking arm 74 into locking engagement with one or the other of the detents 73 as the case may be.

As shown in Figure 7 the clutch locking arm 74 is moved to the unlocked position by means of an operating rod 77 which is connected to and movable with an armature 78 that is arranged to be attracted by a winding 79 also shown in Figure 7a of the drawings. Conductors 80 serve to interconnect the winding 79 to the contacts 20 of the pulse switch 19 and to the conductors 21 as illustrated. It will be understood that, when the contacts 20 are closed and the winding 79 is energized, the armature 78 is attracted and through the operating rod 77 the clutch locking arm 74 is rocked to move its other end out of engagement with the particular detent 73 with which it was previously engaged whereupon the clutch sleeve 66 no longer is held against rotation and it then rotates with that drive shaft 33 causing one or the other of the type roller releasing cams 62 to rock the operating arm 61 for moving the type roller locking arm 57 out of engagement with one or the other of the detents 56 on the type roller 22. As indicated hereinbefore, when this takes place, the type roller 22 is driven by the drive shaft 33 through the friction clutch 52.

It will be recalled that tthe type roller 22 is mounted on an auxiliary frame 24 which is removable from the transverse frame 11 to permit ready access to the type roller 23 for adjusting the indicia thereon. The details of construction of the auxilary frame 24 and related parts are shown in Figures 8–13 to which reference now will be had.

Figure 3:
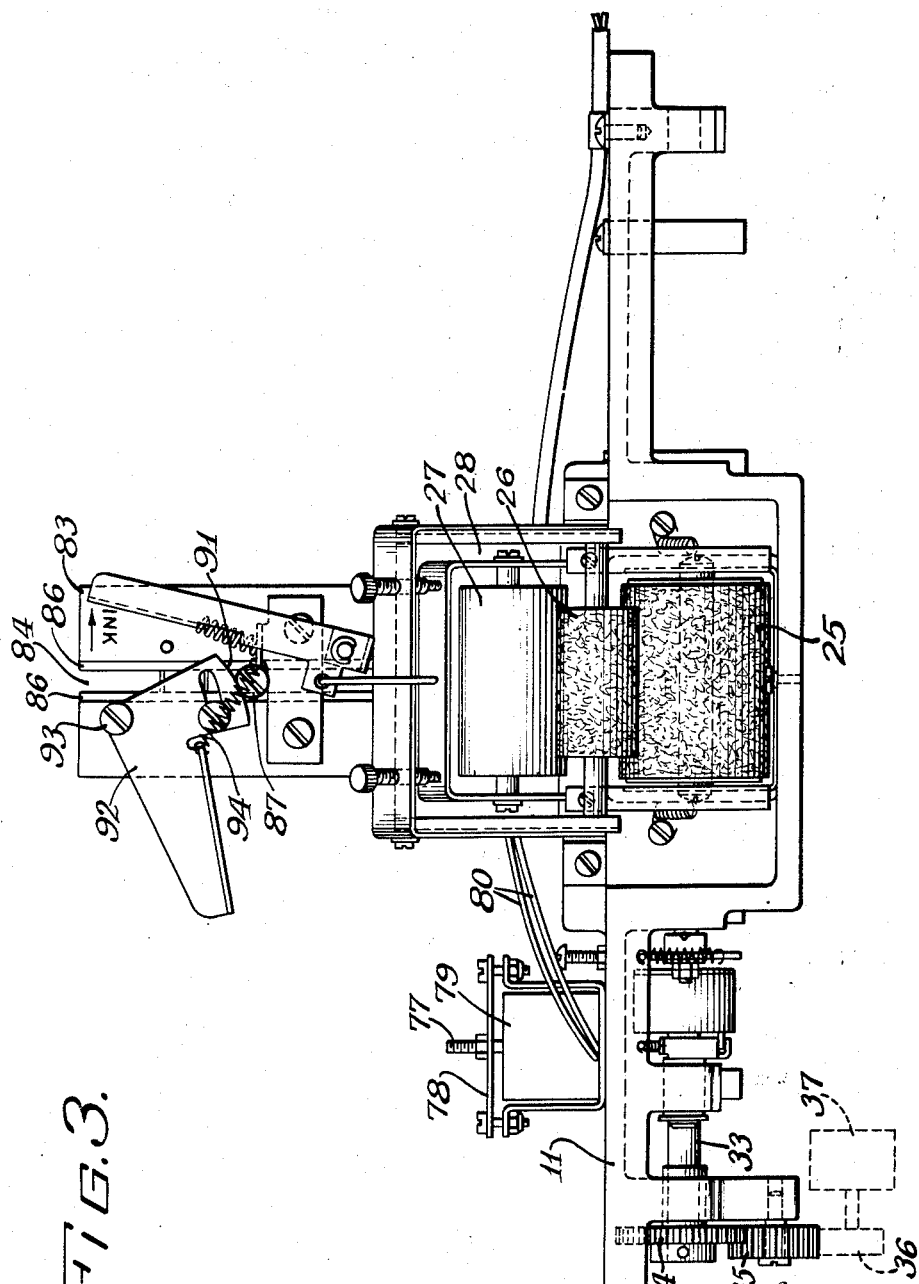
Figure 3 is a top plan view of the portion of the machine shown in Figure 2.

The auxiliary frame 24 is mounted on or underneath a plate 83 which extends from the transverse frame 11 as shown more clearly in Figure 3 of the drawings. The plate 83 is provided with a central slot 84 for receiving a rib 85 that projects upwardly from the auxiliary frame 24. The sides of the central slot 84 are recessed as indicated at 86 in Figure 3 in order to receive heads 87 and 88 of a screw and pin 89 and 90, respectively, that project upwardly from the auxilary frame 24 and through the slot 84 when the auxiliary frame 24 is in operative position underneath the plate 83. The auxiliary frame 24 is held in operative position by means of a cam face 91 on a lever 92 that is pivoted at 93 on the upper side of the plate 83. A spring 94 acts to bias the lever 92 and thereby the cam face 91 into operative engagement with the head 87. When the auxiliary frame 24 is to be removed from the plate 83 it will be understood that the lever 92 is swung in a clockwise direction, as viewed in Figure 3, to move the cam face 91 out of the path of the head 87 whereupon the auxiliary frame 24 can be removed.

Referring now particularly to Figures 11 and 12 of the drawings, it will be observed that longitudinally extending diametrically opposite openings 97 are provided in the type roller 22 and that duplicate type means 98 and 99 are provided on the surface of the roller 22 between these openings 97. It will be understood that the duplicate type means 98 and 99 can carry the name of the bank, letters indicating paid or other suitable legends employed in endorsing checks. Bands 100 held in place by clamp screws 101 serve to secure the type means 98 and 99 in position on the type roller 22.

In addition to indicating the name of the bank and that the check has been paid, it is also desirable to indicate on the back of the check when it is endorsed the date of the endorsements and other identifying data. For this purpose a pair of shafts 102 are provided on the type roller 22 longitudinally thereof and are centrally positioned with respect to the openings 97. Pairs of rollers 103 are rotatably mounted on the shafts 102 and a pinion 104 is fast to each roller 103 so as to rotate therewith. Each set of pinions 104 meshes with an intermediate gear wheel 105 which is rotatable about the shaft 23. It is desirable to prevent free rotation of intermediate gear wheels 105 and the pinions 104 driven thereby. For this purpose balls 106 are slidably mounted on opposite sides of each gear wheel 105 as shown in Figure 12 and are urged into engagement with the teeth thereof by springs 107. Indicia or type bearing belts 108 are trained over each pair of rollers 103. As shown in Figure 11 the belts 108 carry letters or numerals to provide the desired indication. The same indication is provided at each of the openings 97. Thus it is necessary for the type roller 22 to rotate only through a half a revolution in order to completely endorse a check.

It is necessary to shift some of the belts 108 each day. For this purpose provision is made for rotating one or the other of each pair of pinions 104. For this purpose tips 109 can be moved into engagement with the adjacent tooth of a pinion 104 for advancing the respective belt 108 one character. The tips 109 are located at the forward ends of push rods 110 which are slidably mounted on the auxiliary frame 24. Springs 111 serve to hold the push rods 110 in retracted position. A sufficient number of push rods 110 are provided for shifting the belts 108 which require daily or monthly adjustment. No push rod is provided for adjusting the belts carrying the numerals indicating the year since their adjustment is so infrequent as to not require a special push rod therefor.

At the outer ends of the push rods 110 heads 112 are provided. These operating heads 112 are provided with suitable characters, as shown, to indicate their function. It is desirable that unauthorized adjustment of the indicia on the type roller 22 be prevented. For this purpose a cover 113 is provided and it is rockably mounted at 114 on the auxiliary frame 24. It will be understood that the cover 113 can be raised to permit access to the operating heads 112 only when the auxiliary frame 24 is withdrawn from underneath the plate 83. The upward movement of the cover 113 is prevented by interference with the underside of the plate 83 as will be clear from a consideration of Figure 4.

In order to hold the type roller 22 in fixed position to permit manipulation of the indicia or type belt bearing belts 108 by the push rods 110 a lever 117 is provided which is rockably mounted at 118 near the forward end of the auxiliary frame 24 as shown in Figure 8. The lever 117 has a notch 119 which registers with the adjacent detent 56 and is urged into engagement therewith by a coil tension spring 120. As soon as the auxiliary frame 24 is withdrawn from the plate 83, the spring 120 rocks the lever 117 into locking engagement with the adjacent detent 56 and thus holds the type roller 22 against rotation. When the auxiliary frame 24 is inserted into the endorsing machine, the upper end of the lever 117 engages the under side of the transverse frame 11 and it is moved to such a position that it no longer interferes with the rotation of the type roller 22.

In operation the motor 37 continuously drives the drive shaft 33 and also the shaft 39 which drives the impression roller 29. The type roller 22 is held against rotation by the type roller locking arm 57. The friction clutch 52 permits the shaft 33 to rotate continuously while the slip disc 51 is held against rotation. When a check engages the wing 17 of the flipper, the lever 18 is rocked downwardly to operate the pulse switch 19. Contacts 20 are closed and the winding 79 of the electromagnetic device is energized to attract the armature 78. This moves the clutch locking arm 74 out of engagement with one of the detents 73 on the clutch sleeve 66 and permits the latter to rotate conjointly with the shaft 33. Since the plate 63 rotates with the sleeve 66, one of the type roller releasing cams 62 engages the operating arm 61 and rocks the type roller locking arm 57 out of engagement with one of the detents 56 on the type roller 22. The type roller 22 then is rotated through the agency of the friction clutch 52 driving the pin 50 and in turn the driving arm 48 attached to the shaft 23 carrying the type roller 22. The check is endorsed as it passes between the type roller 22 and the impression roller 29.

As soon as the cam 62 moves out of engagement with the operating arm 61, the spring 59 biases the type roller locking arm 57 into a position where it engages the next detent 56 after the type roller 22 has completed half a revolution. It is then held against further movement.

After the check has passed beyond the wing 17 of the flipper, the contacts 20 of the pulse switch 19 are opened and winding 79 is deenergized. Spring 76 then biases the clutch locking arm 74 into such position that the next detent 73 on the clutch sleeve 66 is engaged and it is prevented from further rotation. This cycle of operation is repeated for each check to be endorsed.

The structure relating to the mounting of the type roller 22 and the manipulation of the indicia or type bearing belts 108 of the type roller to selectively position different indicia or type in printing position is the subject matter of the copending application of Henry J. Koeber, Jr., Serial No. 539,975, filed October 12, 1955.

Since certain changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. In apparatus for endorsing checks and the like, in combination, endorsing means including a type roller, means for guiding checks to be endorsed to said endorsing means, a detent at one end of said type roller, a type roller locking arm biased into locking engagement with said detent on said type roller, a driving arm directly connected to said type roller, a shaft and means for continuously driving the same; an auxiliary clutch on said shaft having a sliding friction connection therewith, a detent on said clutch, and a type roller releasing cam on said clutch; a clutch locking arm biased into locking engagement with said detent on said auxiliary clutch, means connected to said clutch locking arm to move the same out of engagement with said detent on said auxiliary clutch, an operating arm connected to said type roller locking arm and arranged to be engaged by said type roller releasing cam to move said type roller locking arm out of engagement with said detent on said type roller, a main clutch on said shaft carrying means for engaging said driving arm connected to said type roller; and means responsive to a check as it approaches said endorsing means for effecting operation of said means connected to said clutch locking arm and subsequent release of said auxiliary clutch to rotate with said shaft whereupon said operating arm moves said type roller locking arm to release said type roller and the latter is rotated by said driving arm driven by said means on said main clutch to endorse the check as it passes along said guide rollers.

2. In apparatus for endorsing checks and the like, in combination, endorsing means including a type roller, means for guiding checks to be endorsed to said endorsing means, a detent at one end of said type roller, a type roller locking arm biased into locking engagement with said detent on said type roller, a driving arm directly connected to said type roller, a shaft and means for continuously driving the same; a clutch sleeve on said shaft having a sliding friction connection therewith, a detent at one end of said clutch sleeve, and a type roller releasing cam at the other end; a clutch locking arm biased into locking engagement with said detent on said clutch sleeve, means connected to said clutch locking arm to move the same out of engagement with said detent on said clutch sleeve, an operating arm connected to said type roller locking arm and arranged to be engaged by said type roller releasing cam to move said type roller locking arm out of engagement with said detent on said type roller, a friction clutch on said shaft carrying means for engaging said driving arm connected to said type roller, and means positioned in the path of a check as it approaches said endorsing means for effecting operation of said means connected to said clutch locking arm and subsequent release of said clutch sleeve to rotate with said shaft whereupon said operating arm moves said type roller locking arm to release said type roller and the latter is rotated by said driving arm driven by said means on said friction clutch to endorse the check as it passes along said guide rollers.

3. In apparatus for endorsing checks and the like, in combination, endorsing means including a type roller, means for guiding checks to be endorsed to said endorsing means including a pair of guide rollers mounted for rotation at the ends of said type roller and rotatable about its axis of rotation independently thereof, a detent at one end of said type roller, a type roller locking arm biased into locking engagement with said detent on said type roller, a driving arm directly connected to said type roller, a shaft having one of said guide rollers fast thereon, means for continuously driving said shaft; a clutch sleeve on said shaft having a sliding friction connection therewith, a detent at one end of said clutch sleeve, and a type roller releasing cam at the other end of said clutch sleeve; a clutch locking arm biased into locking engagement with said detent on said clutch sleeve, means connected to said clutch locking arm to move the same out of engagement with said detent on said clutch sleeve, an operating arm connected to said type roller locking arm and arranged to be engaged by said type roller releasing cam to move said type roller locking arm out of engagement with said detent on said type roller, a friction clutch within said one guide roller rotatable with said shaft and carrying means for engaging said driving arm connected to said type roller, and means responsive to a check as it approaches said guide rollers for effecting operation of said means connected to said clutch locking arm and subsequent release of said clutch sleeve to rotate with said shaft whereupon said operating arm moves said type roller locking arm to release said type roller and the latter is rotated by said driving arm driven by said means on said friction clutch to endorse the check as it passes along said guide rollers.

4. In apparatus for endorsing checks and the like, in combination, endorsing means including a type roller, means for guiding checks to be endorsed to said endorsing means including a pair of guide rollers mounted for rotation at the ends of said type roller and rotatable about its axis of rotation independently thereof, a detent at one end of said type roller, a type roller locking arm biased into locking engagement with said detent on said type roller, a driving arm directly connected to said type roller, a shaft having one of said guide rollers fast thereon, means for continuously driving said shaft; a clutch sleeve on said shaft having a sliding friction connection therewith, a detent at one end of said clutch sleeve, and a plate at the other end of said clutch sleeve and adjustable about the axis of rotation of said clutch sleeve, said plate having a type roller releasing cam projecting therefrom; a clutch locking arm biased into locking engagement with said detent on said clutch sleeve, an armature operatively connected to said clutch locking arm and a winding cooperating with said armature to move said clutch locking arm out of engagement with said detent on said clutch sleeve, an operating arm connected to said type roller locking arm and arranged to be engaged by said type roller releasing cam to move said type roller locking arm out of engagement with said detent on said type roller; a friction clutch within said one guide roller including a pair of friction discs rotatable with said shaft having a slip disc therebetween carrying a pin for engagement with said driving arm connected to said type roller, and a spring washer holding said friction discs in frictional engagement with said slip disc; and an impulse switch having a switch operating arm positioned in the path of a check as it approaches said guide rollers for effecting the energization of said winding and subsequent release of said clutch sleeve to rotate with said shaft whereupon said operating arm moves said type roller locking arm to release said type roller and the latter is rotated by said driving arm driven by said pin on said slip disc to endorse the check as it passes along said guide rollers.

5. In apparatus for endorsing checks and the like, in combination, endorsing means including a type roller having duplicate type means on opposite sides, means for guiding checks to be endorsed to said endorsing means including a pair of guide rollers mounted for rotation at the ends of said type roller and rotatable about its axis of rotation independently thereof, a pair of detents in diametrically opposite positions at one end of said type roller, a type roller locking arm biased into locking engagement with one or the other of said detents on said type roller, a driving arm directly connected to said type roller, a shaft having one of said guide rollers fast thereon, means for continuously driving said shaft; a clutch sleeve on said shaft having a sliding friction connection therewith, a pair of detents projecting in diametrically opposite positions from one end of said clutch sleeve, and a pair of type roller releasing cams projecting in diametrically opposite positions from the other end of said clutch sleeve; a clutch locking arm biased into locking engagement with one or the other of said detents on said clutch sleeve, means connected to said clutch locking arm to move the same out of engagement with a detent on said clutch sleeve, an operating arm connected to said type roller locking arm and arranged to be engaged by one or the other of said type roller releasing cams to move said type roller locking arm out of engagement with a detent on said type roller, a friction clutch within said one guide roller rotatable with said shaft and carrying means for engaging said driving arm connected to said type roller, and means responsive to a check as it approaches said guide rollers for effecting operation of said means connected to said clutch locking arm and subsequent release of said clutch sleeve to rotate with said shaft whereupon said operating arm moves said type roller locking arm to release said type roller and the latter is rotated by said driving arm driven by said means on said friction clutch to endorse the check as it passes along said guide rollers.

6. In apparatus for endorsing checks and the like, in combination, endorsing means including a type roller having duplicate type means on opposite sides, means for guiding checks to be endorsed to said endorsing means including a pair of guide rollers mounted for rotation at the ends of said type roller and rotatable about its axis of rotation independently thereof, a pair of detents in diametrically opposite positions at one end of said type roller, a type roller locking arm biased into locking engagement with one or the other of said detents on said type roller, a driving arm directly connected to said type roller, a shaft having one of said guide rollers fast thereon, means for continuously driving said shaft; a clutch sleeve on said shaft having a sliding friction connection therewith, a pair of detents projecting in diametrically opposite positions from one end of said clutch sleeve, and a plate at the other end of said clutch sleeve and adjustable about the axis of rotation of said clutch sleeve, said plate having a pair of type roller releasing cams projecting therefrom in diametrically opposite positions; a clutch locking arm biased into locking engagement with one or the other of said detents on said clutch sleeve, an armature operatively connected to said clutch locking arm and a winding cooperating with said armature to move said clutch locking arm out of engagement with a detent on said clutch sleeve, an operating arm connected to said type roller locking arm and arranged to be engaged by one or the other of said type roller releasing cams to move said type roller locking arm out of engagement with a detent on said type roller; a friction clutch within said one guide roller including a pair of friction discs rotatable with said shaft having a slip disc therebetween carrying a pin for engagement with said driving arm connected to said type roller, and a spring washer holding said friction discs in frictional engagement with said slip disc; and an impulse switch having a switch operating arm positioned in the path of a check as it approaches said guide rollers for effecting the energization of said winding and subsequent release of said clutch sleeve to rotate with said shaft whereupon said operating arm moves said type roller locking arm to release said type roller and the latter is rotated by said driving arm driven by said pin on said slip disc to endorse the check as it passes along said guide rollers.

References Cited in the file of this patent

UNITED STATES PATENTS

| | | |
|---|---|---|
| 1,702,763 | Clark | Feb. 19, 1929 |
| 1,987,816 | Bowman | Jan. 15, 1935 |
| 2,173,454 | Muller | Sept. 19, 1939 |
| 2,237,269 | Brand | Apr. 1, 1941 |
| 2,406,040 | Ryan | Aug. 20, 1946 |
| 2,683,413 | Muller | July 13, 1954 |
| 2,743,671 | Weber | May 1, 1956 |